US012750134B2

(12) United States Patent
Dawson-Elli et al.

(10) Patent No.: US 12,750,134 B2
(45) Date of Patent: Sep. 29, 2026

(54) PASSIVE OPTICAL NETWORK MONITORING

(71) Applicant: CORNING RESEARCH & DEVELOPMENT CORPORATION, Corning, NY (US)

(72) Inventors: David Francis Dawson-Elli, Charlotte, NC (US); Peter Gerard Wigley, Corning, NY (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 276 days.

(21) Appl. No.: 18/383,291

(22) Filed: Oct. 24, 2023

(65) Prior Publication Data

US 2024/0146410 A1 May 2, 2024

Related U.S. Application Data

(60) Provisional application No. 63/419,484, filed on Oct. 26, 2022.

(51) Int. Cl.
*H04B 10/071* (2013.01)
*H04Q 11/00* (2006.01)

(52) U.S. Cl.
CPC ....... *H04B 10/071* (2013.01); *H04Q 11/0067* (2013.01); *H04Q 2011/0083* (2013.01)

(58) Field of Classification Search
CPC .................................................... H04B 10/071
See application file for complete search history.

(56) References Cited

U.S. PATENT DOCUMENTS 7,289,729 B1 * 10/2007 Eslambolchi ........ H04B 10/071 398/31
9,312,953 B2 4/2016 Soto et al.
2002/0075534 A1 * 6/2002 Feldman ............. H04J 14/0252 398/21
2007/0025676 A1 * 2/2007 Russell .............. G01M 11/3136 385/100
(Continued)

FOREIGN PATENT DOCUMENTS

CA 2887950 A1 4/2014
CA 2830917 C 7/2019
(Continued)

OTHER PUBLICATIONS

Ding et al., "Distributed Optical Fiber Sensors Based on Optical Frequency Domain Reflectometry: A review", Sensors, 2018, 31 pages.

*Primary Examiner* — Nathan M Cors
(74) *Attorney, Agent, or Firm* — Michael E. Carroll, Jr.

(57) ABSTRACT

A system, method, and device for monitoring a passive optical network (PON). A probe signal is transmitted into the PON. A waypoint device located in the PON proximate to a network waypoint reflects one or more portions of the probe signal in a manner that embeds an address of the waypoint device in a return signal. The address is extracted from the return signal and used to identify the network waypoint associated with the waypoint device. The waypoint device may be selectively perturbed, and the perturbation detected based on changes in the reflected signal to validate the physical identity of the waypoint device.

27 Claims, 10 Drawing Sheets

(56) References Cited

U.S. PATENT DOCUMENTS

| | | | | |
|---|---|---|---|---|
| 2011/0211827 | A1 | 9/2011 | Soto et al. | |
| 2013/0051791 | A1* | 2/2013 | Zhao | H04J 14/0282<br>398/17 |
| 2014/0016926 | A1 | 1/2014 | Soto et al. | |
| 2014/0111795 | A1 | 4/2014 | Barnhart et al. | |

FOREIGN PATENT DOCUMENTS

| | | | |
|---|---|---|---|
| EP | 2909599 | A1 | 8/2015 |
| JP | 2015-537200 | A | 12/2015 |
| JP | 2017-101980 | A | 6/2017 |
| WO | 2014/063034 | A1 | 4/2014 |

* cited by examiner

PASSIVE OPTICAL NETWORK MONITORING

PRIORITY APPLICATIONS

This application claims the benefit of priority under 35 U.S.C. § 119 for U.S. Provisional Application Ser. No. 63/419,484 filed on Oct. 26, 2022, the content of which is relied upon and incorporated herein by reference in its entirety.

TECHNICAL FIELD

This disclosure relates generally to optical connectivity, and more particularly to systems, methods, and devices for monitoring a passive fiber optic network.

BACKGROUND

Optical fibers are useful in a wide variety of applications, the most common being as part of the physical layer of a communication protocol through which network nodes communicate over a data network. Benefits of optical fibers include wide bandwidth and low noise operation. An optical distribution network comprised entirely of passive optical components is commonly referred to as a passive optical network (PON). Continued growth of the Internet has resulted in a corresponding increase in demand for network capacity and reliability. This demand for reliable network capacity has, in turn, caused carriers to extend their PONs closer to the end user. This extension of optical fiber toward the ends of the network (e.g., node, curb, building, home, etc.) is commonly referred to as Fiber To The x (FTTx).

PONs including large numbers of optical fibers connecting large numbers of end users, such as those built to support FTTx, face challenges of complexity. Specifically, there is an ongoing need to know what fiber paths exist and whether they are active. When changes to these constantly evolving networks are made, there is a further need to generate instructions for changing connections, a process for verifying that these changes were made accurately, and a process for updating network documentation.

Known methods of tracking service provisioning and maintenance of PONs suffer from inefficiencies and are often inaccurate. The causes include reliance on labelling of optical fibers, hard-copy work orders, an inability to positively verify fiber connections, and manual updating of network maps. As PONs expand, network operators face increasing challenges managing service provisioning, network operations and management, and maintenance.

During the construction or retrofit of a PON, optical splitters or wavelength division multiplexers (WDMs) are configured at convergence points by patching between a feeder cable and a distribution cable, typically in a cabinet designed for this purpose. The feeder cable connects back to a port of an optical line terminal at the central office, and the distribution cable carries the optical signals forward into the PON. On the downstream side of the optical splitter, one of a collection of fibers (typically 32 or 64) may be routed through the PON from a local convergence point (e.g., a splitter or WDM cabinet) to a network access point (NAP) that passes through a neighborhood or business campus. A subscriber connection can be fulfilled by connecting an available port of a wave division multiplexer or optical splitter at the local convergence point through a network access point to an optical network terminal at the subscriber site, e.g., a home, business, or cellular tower. Ideally, this results in the selected port of the optical line terminal being optically coupled through the PON to the correct subscriber optical network terminal.

Optical splitters and patch panels are typically organized in cabinets designed to facilitate patching from feeder cables through optical splitters to distribution cables. These cabinets are typically located outside ("street cabinet"), in a basement (multi-dwelling unit cabinet) or in an equipment/data room. Enterprise subscribers with point to point (e.g., dedicated duplex fiber) connections sometimes bypass splitters. In this case, a patch would be provided from an optical fiber of the feeder cable directly to an optical fiber of the distribution cable, effectively dedicating feeder cable optical fibers directly to the subscriber for dedicated high bandwidth service.

A number of steps are involved in patching a distribution cable fiber into an optical splitter leg or a feeder fiber leg. Those steps might vary in detail, but in general they represent the same challenges. If a mistake is made, an existing subscriber already patched into the PON may have their service disrupted. The possibility of disrupting the high-bandwidth service of an existing subscriber may lead to anxiety and delays by the field technician as they double or triple-check the instructions and cabinet labeling. In a worst-case scenario, a service disruption occurs, resulting in a service call and potentially financial penalties to the carrier for failing to meet the terms of a service level agreement.

Cabinets at or near capacity may include a large number of splitters serving a large number of subscribers, a mix of both fiber to the home and enterprise connections, cable congestion, and poor organization of optical fibers and cables. Collectively, this crowding and lack of organization can result in chaos as cabinet resources are exhausted. In some areas "mutualization" requires hardware resources to be shared by multiple carriers. Where mutualization is mandated, optical fibers and cables installed by one carrier may be accidently disturbed or damaged by field technicians performing work orders for another carrier.

When performing a patching operation to provision an optical path between a subscriber's optical network terminal and a carrier's optical line terminal, it would be advantageous to determine if the optical path is active/busy, reserved, or free. However, it is currently impossible to interact with the physical optical path to facilitate making this determination without risking disruption of service to a subscriber connected downstream of that path. This inability to physically confirm the status of an optical path is a significant source of anxiety, and causes delays when installing or retrofitting PONs.

Thus, there is a need for systems, methods, and devices that enable field technicians to validate optical pathways back to the central office in a PON without the risk of disrupting network traffic to existing subscribers.

SUMMARY

In an aspect of the disclosure, an improved system for monitoring a passive optical network is disclosed. The system includes a transmitter configured to transmit a probe signal into the passive optical network, a receiver configured to receive a return signal from the passive optical network, a plurality of waypoint devices each including one or more reflective elements configured to embed an address of the waypoint device in the return signal, one or more processors operatively coupled to the transmitter and the receiver, and a memory operatively coupled to the one or more processors. Each waypoint device is located in one or more optical paths of the passive optical network. The memory includes program code that, when executed by the one or more processors, causes the system to, for each waypoint device, extract the address of the waypoint device from the return signal, and identify a network waypoint in the passive optical network associated with the waypoint device based at least in part on the address of the waypoint device. The network waypoint may be included in any suitable waypoint device as desired and may take any suitable form for creating an address in the optical network.

In an embodiment of the disclosed system, the program code may further cause the system to determine an optical path distance to the waypoint device based on the return signal, and identify the network waypoint in the passive optical network associated with the waypoint device based on both the address of the waypoint device and the optical path distance to the waypoint device.

In another embodiment of the disclosed system, the program code may cause the system to extract the address of each waypoint device from the return signal by identifying a plurality of reflected signals that are associated with the waypoint device, determining one or more spacings between the plurality of reflected signals, and determining the address of the waypoint device based at least in part on the one or more spacings between the plurality of reflected signals.

In another embodiment of the disclosed system, the program code may further cause the system to identify at least one of the plurality of reflected signals as a reference reflected signal, and determine the one or more spacings between the plurality of reflected signals based on an optical path distance between the reference reflected signal and each of the other reflected signals of the plurality of reflected signals.

In another embodiment of the disclosed system, the program code may further cause the system to extract the address of each waypoint device from the return signal by determining an amplitude of each of the other reflected signals of the plurality of reflected signals relative to the amplitude of the reference reflected signal, and determining the address of the waypoint device based at least in part on the relative amplitudes of the other reflected signals.

In another embodiment of the disclosed system, the program code may cause the system to extract the address of each waypoint device from the return signal by identifying one or more reflected signals that are associated with the waypoint device, determining a wavelength of each of the one or more reflected signals, and determining the address of the waypoint device based at least in part on the wavelength of each of the one or more reflected signals.

In another embodiment of the disclosed system, the one or more reflected signals may include a plurality of reflected signals, the program code may further cause the system to identify at least one of the plurality of reflected signals as a reference reflected signal, and the wavelength of each of the reflected signals other than the reference reflected signal may be determined based on a comparison between the wavelength of the reflected signal and the wavelength of the reference reflected signal.

In another embodiment of the disclosed system, the program code may further cause the system to extract the address of each waypoint device from the return signal by determining an amplitude of each of the reflected signals other than the reference reflected signal relative to the amplitude of the reference reflected signal, and determining the address of the waypoint device based at least in part on the relative amplitudes of the reflected signals.

In another embodiment of the disclosed system, at least one reflective element of at least one of the waypoint devices may include a reflective characteristic that changes in response to a perturbation.

In another embodiment of the disclosed system, the system may further include an actuator in communication with the one or more processors, and a human machine interface operatively coupled to the one or more processors. In this embodiment, the program code may be further configured to cause the system to receive input from the human machine interface indicating activation of the actuator, and in response to receiving the input, activate the actuator to generate the perturbation.

In another embodiment of the disclosed system, the program code may be further configured to cause the system to identify a waypoint device being perturbed based on a change in the reflective characteristic of the one or more reflective elements, and in response to identifying the waypoint device being perturbed, cause the human machine interface to provide an indication of the identity of the waypoint device being perturbed.

In another aspect of the disclosure, a method of monitoring the passive optical network is disclosed. The method includes transmitting the probe signal into the passive optical network, and reflecting, by each waypoint device of the plurality of waypoint devices, one or more reflected signals each including a portion of the probe signal, wherein the one or more reflected signals embed the address of the waypoint device in the return signal. The method further includes receiving the return signal from the passive optical network and, for each waypoint device, extracting the address of the waypoint device from the return signal and identifying the network waypoint in the passive optical network associated with the waypoint device based at least in part on the address of the waypoint device.

In an embodiment of the disclosed method, the method may further include determining the optical path distance to the waypoint device based on the return signal, and identifying the network waypoint in the passive optical network associated with the waypoint device based on both the address of the waypoint device and the optical path distance to the waypoint device.

In another embodiment of the disclosed method, extracting the address of the waypoint device from the return signal may include identifying the one or more reflected signals that are associated with the waypoint device. In this embodiment, the method may determine the address of the waypoint device based at least in part on one or more of the number of reflected signals, the spacings between the reflected signals, the wavelengths of the reflected signals, and the amplitudes of the reflected signals.

In another embodiment of the disclosed method, the method may further include identifying at least one of the plurality of reflected signals as the reference reflected signal. In this embodiment, determining the spacings between the plurality of reflected signals may include determining the optical path distance between the reference reflected signal and each of the other reflected signals, determining the wavelengths of the reflected signals may include comparing the wavelength of each of the other reflected signals to the wavelength of reference reflected signal, and determining the amplitudes of the reflected signals may include comparing the amplitude of each of the other reflected signals to the amplitude of the reference reflected signal.

In another embodiment of the disclosed method, the method may further include perturbing one of the plurality of waypoint devices, detecting the change in the characteristic of one or more reflected signals associated with the waypoint device being perturbed, and providing the indication of the identity of the waypoint device being perturbed.

In another embodiment of the disclosed method, perturbing the waypoint device may include activating the actuator configured to generate the perturbation in the waypoint device.

In another aspect of the disclosure, a waypoint device for monitoring the passive optical network is disclosed. The waypoint device includes a first optical interface, a second optical interface, and an optical path operatively coupling the first optical interface to the second optical interface. The optical path includes one or more reflective elements configured to pass traffic signals and reflect one or more reflected signals. Each of the reflected signals includes a portion of the probe signal such that the reflected signals embed the address of the waypoint device in the return signal.

In an embodiment of the disclosed waypoint device, the address is embedded in the return signal by at least one of the number of the reflected signals, the spacings between the reflected signals, the wavelengths of the reflected signals, and the amplitudes of the reflected signals.

In another embodiment of the disclosed waypoint device, at least one of the one or more reflective elements includes the reflective characteristic that changes in response to the perturbation.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
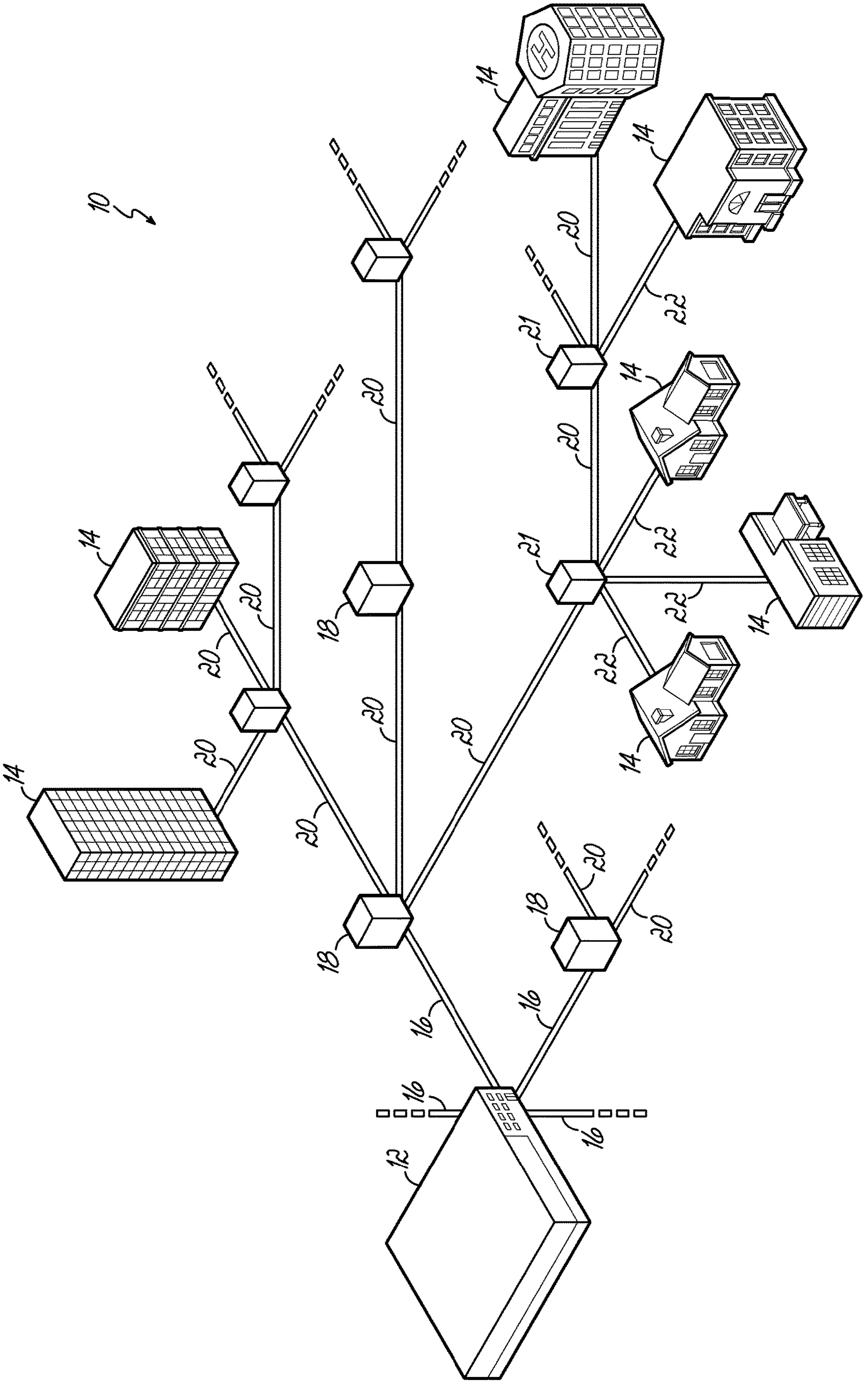
FIG. 1 is a schematic view illustrating an exemplary carrier network including a passive optical network in which embodiments of the disclosure may be used.

Various embodiments will be further clarified by examples in the description below. In general, the description relates to a system and method that identifies network waypoints and their locations within a passive optical network (PON). To this end, one or more waypoint devices are placed in the PON proximate to each selected network waypoint. Network waypoints may include, for example, fibers, cables, components, ports, connections, or any other location of interest to the network operator. By way of example, the network waypoint may be a Bragg grating on an optical fiber of a cable or other network device, a partially reflective element in a connector such as near a connector endface or as part of a dust cap, a terminator device having a reflective element installed into a port of a terminal or the like. Each waypoint device is configured to reflect a portion of a probe signal in a manner that embeds data defining an address of the waypoint device in a return signal. An optical path distance to the waypoint device may also be determined based on an amount of time between transmission of the probe signal and reception of one or more reflected signals from the waypoint device. One or both of the address and distance may be used to uniquely identify the waypoint device as well as determine its location in the PON.

Based on one or both of the identities and locations of the waypoint devices, a network monitoring system can map out the PON and determine when changes to the network have occurred, e.g., due to the addition of a new network waypoint, the removal of a previously existing network waypoint, or the failure of a network component. To this end, and to facilitate network monitoring and maintenance, the locations and identities of the waypoint devices may be associated with other network information in a database. This information may include, for example, the type, geographic location, serial number, installation date, pending work orders, etc., associated with network components proximate to the waypoint device.

Each waypoint device includes one or more reflective elements configured to embed the address of the waypoint device in the return signal. Suitable reflective elements may include optical band reject filters configured to reflect a narrow band of wavelengths. These types of reflective elements typically comprise a plurality of thin dielectric layers. One such type of reflective element suitable for use in waypoint devices is known as a fiber Bragg grating. Fiber Bragg gratings have demonstrated off resonance scatter losses of $<0.2$ dB, and are thus suitable for generating reflected signals at one or more dedicated wavelengths.

The reflected signals may be detected within the PON by a monitoring system. The monitoring system may include an optical interrogator and a processing unit configured to process signals received from the optical interrogator. The optical interrogator may include, for example, one or more of an optical time domain reflectometer (OTDR), an optical backscatter reflectometer (OBR), and a Phase-OTDR. Optical interrogators typically include a transmitter and a receiver. For example, an OTDR transmitter is configured to transmit a probe signal comprising a pulse of light ("optical signal") including one or more specified wavelengths into the PON. An OTDR receiver is configured to measure backscatter and other reflections of the optical pulse received from the PON as a function of time. Because the return signal comprises a summation of reflections generated by the PON along the length of the probe signal, the spatial resolution of the return signal may depend at least in part on the length of the optical pulse or pulses comprising the probe signal. By way of example, a 1 nsec optical pulse may enable a spatial resolution of about 0.1 m, while a 1 μsec optical pulse may only enable a spatial resolution of about 100 m. The length of the optical pulse may also be adjusted depending on the type of data being collected from the PON by a given probe signal. The spatial resolution of an OTDR may also be improved to provide values less than the pulse width by the use of digital sampling and signal processing techniques such as Fourier Transform algorithms.

The characteristics of the return signal may be analyzed to determine the optical path distance to specific reflected signals. As described in more detail below, various combinations of distance, number, spacing, amplitude, and wavelength of the reflected signals in the return signal may be decoded to determine the optical path distances and addresses of waypoint devices in the PON. When two or more waypoint devices are connected in series, their addresses may be separately determined based on multipath interference on common wavelengths, or based on the address coding scheme.

Optical time domain reflectometry is typically performed in or around a range of 1625 to 1650 nm with a 5 nm spectral width dedicated to the metrology, but can also be made to operate at 1310 nm, 1490 nm, 1550 nm, or other suitable wavelengths. By way of example, fiber Bragg gratings are commonly fabricated to make notch reflection filters on 50 GHz (0.4 nm) spacing. This would allow 12-13 distinct wavelengths to be used within a 5 nm spectral width reserved for optical time domain reflectometry. These distinct wavelengths could be used to define addresses in the PON for waypoint devices including fiber Bragg gratings. The wavelengths can be used to individually address ports, or combined as a method of binary coding. By providing a sufficient number of wavelengths (with each wavelength representing a coding bit), this exemplary address coding scheme could be used to individually address ports or combined to provide sufficient address coding diversity to map an entire network topology to a physical layout. Alternatively, specialized OTDR interrogators employing a tunable laser source can be used to troubleshoot over the WDM C-band (1527.99 nm-1567.95 nm). If such a tunable OTDR is employed, the wavelength representing coding bits cab be extended significantly.

Waypoint devices may be spliced or connected into an optical fiber or otherwise introduced into an optical path of the PON near a network waypoint to be associated with the waypoint device. Network waypoints in the PON may be associated with points of interest along optical paths of the PON. Network waypoints may be chosen, for example, to mark the location of an optical component, a connection between optical fibers, an optical port, or a terminal end of an optical path. These points of interest are commonly referred to as demarcation points. The reflectivity of each reflective element of the waypoint device may be relatively low to allow transmission of sufficient light at the reflection wavelength be used in the identification of a downstream waypoint device. Waypoint devices may be strategically placed on a port or in the optical path proximate to the port to facilitate the identification of the port in a logical network layout. In this scenario, a technician equipped with a mobile computing device in communication with a centralized monitoring system can visually confirm the presence or absence of a waypoint device by observing its unique associated coded signature on the return signal.

In some embodiments, a characteristic of the reflected signal may vary in response to the waypoint device being perturbed. For example, the amplitude, wavelength, waveform shape, or another characteristic of the reflected signal may vary in response to strain or temperature changes being applied to the waypoint device. Waypoint devices that are sensitive to external perturbations may be used to validate that a specific waypoint device identified by a field technician is associated with an optical component identified in a work order, for example.

By way of example, fiber Bragg gratings are known to experience changes in their reflective characteristics (e.g., the amplitude and/or wavelength of the reflected signals) as a result of applying a perturbation. This can be accomplished by applying stress to the fiber Bragg grating in a controlled manner. The stress can be applied by using fingers or hands, or by the application of a controlled force using a flexure tool, a spring, or a prescribed bend. The stress could be applied continuously or intermittently. Intermittent stress could be applied by using a vibrator, such as the vibration produced by the type of device similar to those used to cause vibration in a mobile phone.

In each case, the stress (either applied continuously for a temporary period, or intermittently using a buzzer, acoustic device or other source of cyclical mechanical movement) causes a shift in the fiber Bragg grating frequency (wavelength) and/or amplitude detected at the OTDR. By way of example, for waypoint devices integrated into a pigtail, a positive, real time, and highly reliable confirmation can be made that a pigtail being perturbed is the pigtail that has been identified by the monitoring system. This feature may enable field technicians to identify and trace the optical path between a network component and an optical line terminal associated therewith from any physical location in the PON. The field technicians can, for example, use this feature to immediately and unequivocally confirm that they have properly identified a port associated with a work order and plan of record.

FIG. 1 depicts an exemplary FTTx carrier network 10 that distributes optical signals generated at a switching point 12 (e.g., a central office) to one or more subscriber premises 14. Optical line terminals (OLTs—not shown) at the switching point 12 convert electrical signals into optical signals. Fiber optic feeder cables 16 then carry the optical signals to various local convergence points 18. The convergence points 18 act as locations for splicing and making cross-connections and interconnections. The local convergence points 18 often include splitters or WDM components to enable any given optical fiber in the feeder cable 16 to serve multiple subscriber premises 14. As a result, the optical signals are "branched out" from the optical fibers of the feeder cables 16 to optical fibers of fiber optic distribution cables 20 that exit the local convergence points 18.

At remote network access points 21 closer to the subscriber premises 14, some or all of the optical fibers in the distribution cables 20 may be accessed to connect to one or more subscriber premises 14. Drop cables 22 extend from the network access points 21 to the subscriber premises 14, which may be single-dwelling units (SDU), multi-dwelling units (MDU), businesses, and/or other facilities or buildings. An optical network terminal (ONT—not shown) located at or inside the subscriber premises 14 receives one or more optical signals and converts the optical signals back to electrical signals at the remote distribution points or subscriber premises 14.

Because the path between the OLT and ONT consists of passive components (e.g., optical fibers and splitters), this portion of the carrier network 10 is commonly referred to as the PON. By way of example, an OLT at a central office may be connected to an optical splitter at a convergence point 18 near a group of subscriber premises 14 by an optical fiber. Individual optical fibers may then connect this optical splitter to each of several subscriber premises 14 in the group served by the convergence point 18. Optical splitters may also be cascaded to connect a large number of subscribers to the central office through a single optical fiber.

Figure 2:
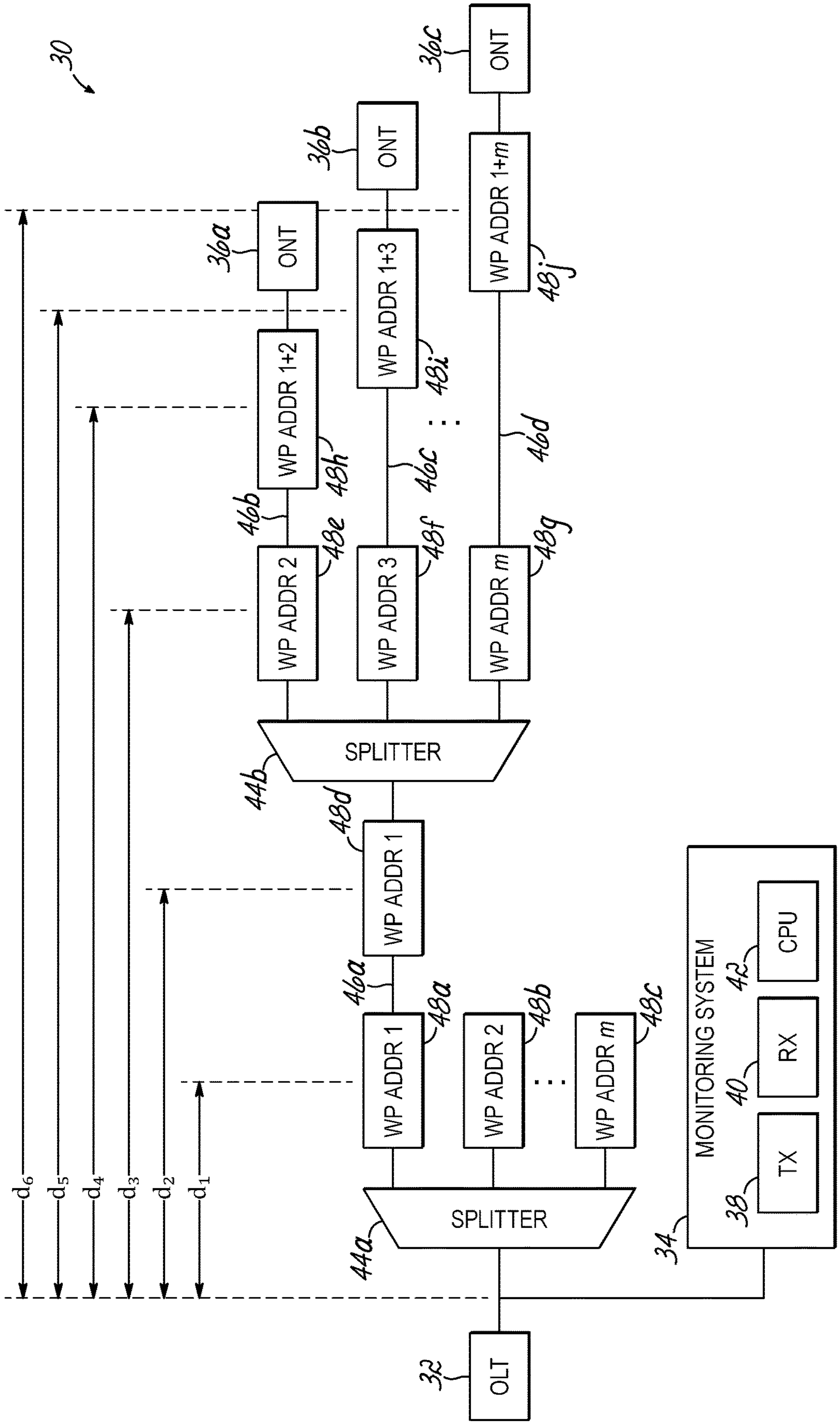
FIG. 2 is a schematic view of an exemplary portion of a passive optical network including waypoint devices and a network monitoring system.

FIG. 2 depicts an exemplary optical network 30 including an optical line terminal 32 and a monitoring system 34 operatively coupled to a plurality optical network terminals 36 through a PON. The monitoring system 34 includes a probe signal transmitter 38, a return signal receiver 40, and a processing unit 42 configured to operate the transmitter 38 and process signals received from the receiver 40. The PON includes a plurality of 1×m optical splitters 44, fiber optic cables 46 and waypoint devices 48. The optical splitters 44 are connected in a series configuration by a fiber optic cable 46*a*. The waypoint devices 48 may include optical interfaces (e.g., connectors or ports—not shown) that facilitate coupling the waypoint devices 48 to the PON. Each waypoint device 48 may be located proximate to interfaces between a fiber optic cable 46 and another network component, e.g., an optical network terminal 36 or optical splitter 44, that couples to the waypoint device 48 through one of the optical interfaces thereof.

The monitoring system 34 may transmit a probe signal into the PON and receive a return signal comprising the portions of the probe signal that are reflected or scattered back to the monitoring system 34 by the PON. The return signal may be processed by the monitoring system 34, and the resulting data provided to a network technician working remotely anywhere within the PON. By way of example, the processed return signal data may be in the form of a graph showing one or more properties of the received optical signals (e.g., amplitude, phase, polarization, etc) verses one or more other parameters (e.g., time, distance, or wavelength).

Each waypoint device 48 is located at an optical path distance (e.g., $d_1$-$d_6$) from the monitoring system 34. The term optical path distance refers to the distance a beam of light travels between two locations in the PON. The optical path distance between two locations can be determined by measuring the amount of time it takes a packet of light to travel through the portion of the PON between these locations. As described in more detail below, each waypoint device 48 is configured to encode data defining one or more addresses (e.g., 1, 2, 3 . . . m) onto one or more reflected signals by reflecting a portion of the probe signal. This data may be encoded onto the reflected signal or signals based on a wavelength $\lambda_x$ of the reflected signal, a distance $d_x$ between one reflected signal and another reflected signal, the amplitude A of the reflected signal, or any combination of wavelength, distance, and amplitude. Wavelength $\lambda_x$, distance $d_x$, and amplitude A of the reflected signal may be measured as an absolute value (e.g., relative to the probe signal or a local reference signal), or relative to a reference reflected signal produced by a reference reflective element.

Figure 3:
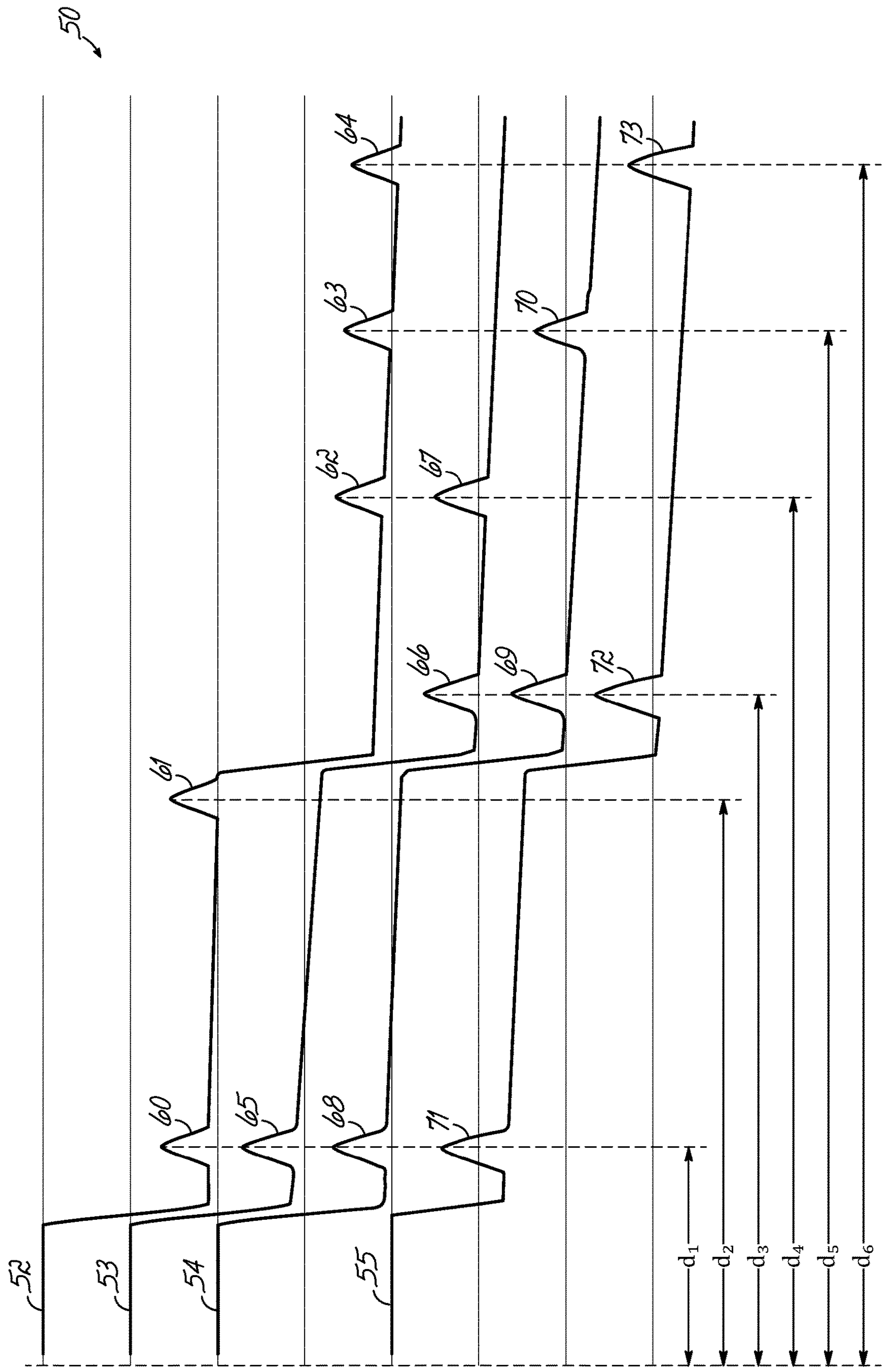
FIG. 3 is graphical view illustrating a return signal received by the monitoring system of FIG. 2.

FIG. 3 depicts a graph 50 including plots 52-55 of amplitude verses optical path distance of a return signal. Each plot 52-55 corresponds to one of the addresses 1-m embedded in the return signal by the waypoint devices 48 of FIG. 2. For purposes of simplicity and clarity, each plot 52-55 is described below as corresponding to a return signal of an optical time-domain reflectometer, and each address 1-m is encoded as a reflected signal at a different wavelength $\lambda_n$, e.g., a reflected signal in a return signal having a wavelength $\lambda_1, \lambda_2, \lambda_3 \ldots \lambda_m$. This type of address coding may be defined, for example, by the following equation:

$$\lambda_n=\lambda_0+\Delta\lambda\times(n-1) \quad \text{Eqn. 1}$$

where n is the address, $\lambda_n$ is the wavelength of the return signal encoding address n, $\lambda_0$ is the shortest wavelength used for coding addresses (e.g., 1650.0 nm), and $\Delta\lambda$ is the wavelength spacing (e.g., 0.4 nm).

The monitoring system 34 may perform optical time-domain reflectometry by transmitting optical pulses into the PON 30 at each wavelength $\lambda_n$. The optical pulses may be transmitted sequentially or simultaneously. After each optical pulse has been transmitted, the monitoring system 34 may receive optical signals that have been scattered or reflected back toward the monitoring system 34 by the components of the PON 30. The received optical signals can then be used to characterize the PON 30 by plotting the amplitude of the return signal as a function of distance as shown in FIG. 3. The monitoring system 34 may decode the addresses and measure the distances to waypoint devices 48 and other components of the PON 30. The monitoring system 34 may then generate an optical map of the PON 30. This map may be stored in a database by the monitoring system 34 based on the decoded addresses and measured distances. Records in the database may associate specific waypoint device addresses with other network information, such as geographic locations or network components proximate to the waypoint device 48.

It has been determined that waypoint devices 48 do not require high reflectivity in the probe signal band. For example, a reflectivity of about −10 dB to −3 dB may be sufficient to identify demarcation points associated with the terminal ends of the optical paths in the PON. It may be desirable to set reflectivity of the waypoint devices as low as possible, but higher than the coefficient for Rayleigh backscattering used interrogator measurements, which should allow the interrogator to resolve optical path lengths down to about 1 m.

Each plot 52-55 includes a plurality of peaks 60-73. Each peak may indicate a location of a reflection in the PON, e.g., a reflection from a waypoint device 48. Plot 52 of the return signal at wavelength $\lambda_1$ includes a respective peak 60-64 at each distance $d_1$, $d_2$, $d_4$, $d_5$, $d_6$ where a waypoint device 48*a*, 48*d*, 48*h*-48*j* including address 1 is located. Likewise, plot 53 of the return signal at wavelength $\lambda$2 includes a respective peak 65-67 at each distance $d_1$, $d_3$, $d_4$ where a waypoint device 48*b*, 48*e*, 48*h* including address 2 is located, plot 54 of the return signal at wavelength $\lambda_3$ includes a respective peak 68-70 at each distance $d_1$, $d_3$, $d_5$ where a waypoint device 48*f*, 48*i* including address 3 is located, and plot 55 of the return signal at wavelength $\lambda_m$ includes a respective peak 71-73 at each distance $d_1$, $d_3$, $d_6$ where a waypoint device 48*c*, 48*g*, 48*j* including address m is located. It should be understood that the distances depicted are not to scale, but rather have been selected to clearly depict features of the disclosure.

The steep drops in amplitude prior to the peaks 60, 65, 68, 71 at distance $d_1$ and the peaks 66, 69, 72 at distance $d_3$ can be attributed to losses through the optical splitters 44. Peaks 60, 65, 68, 71 indicate a reflection at each of wavelengths $\lambda_i$, $\lambda_2$, $\lambda_3$, $\lambda_m$ at distance $d_1$. Peaks 66, 69, 72 indicate a reflection at each of wavelengths $\lambda_2$, $\lambda_3$, $\lambda_m$ at distance $d_3$. Each peak may indicate a distance to, and address of, a waypoint device 48*a*-48*c*, 48*e*-48*g* that is proximate to a branch port of the optical splitters 44. At distance $d_2$, peak 61 indicates a reflection at wavelength $\lambda_1$. This reflection may identify the distance to the interface between optical splitter 44*b* and the back end of fiber optic cable 46*a*.

The locations of the front and back ends of each fiber optic cable 46 may be identified by a waypoint device 48 including the same address, e.g., n=1 for fiber optic cable 46*a*, n=2 for fiber optic cable 46*b*, n=3 for fiber optic cable 46*c*, and n=m for fiber optic cable 46*d*. The depicted addressing scheme may thereby identify a specific fiber optic cable 46 linking two optical components (e.g., splitters) by placing waypoints including the same address proximate to each end of the fiber optic cable 46.

The branch ports of each optical splitter 44 may be coupled to a waypoint device 48 having an address that is unique among the addresses associated with the splitter in question, e.g., n∈(1, 2, 3 . . . m). These waypoint devices 48 may identify the location of the interface between each branch port of the optical splitters 44 and the front end of the fiber optic cable 46 to which the branch port is coupled. Waypoint devices 48 at the back end of each fiber optic cable 46 may include the same address as the waypoint device 48 at the front end of the fiber optic cable 46. Peaks 62, 67 indicating reflections at wavelengths $\lambda_1$ and $\lambda_2$ at distance $d_4$ identify the location of the interface between fiber optic cable 46*b* and optical network terminal 36*a*. Peaks 63, 70 indicating reflections at wavelengths $\lambda_1$ and $\lambda_3$ at distance cis identify the location of the interface between fiber optic cable 46*c* and optical network terminal 36*b*. Peaks 64 and 73 indicating reflections at wavelengths $\lambda_1$ and $\lambda_m$ at distance $d_6$ identify the location of the interface between fiber optic cable 46*c* and optical network terminal 36*c*. In some embodiments, the optical path distance between the trunk and branch ports of the optical splitter 44*b* may be too short for the optical path distance between these points to be resolved by the monitoring system 34. Thus, to avoid interference between the address coding of waypoint device 48*d* and waypoint devices 48*e*-48*g*, the waypoint devices 48*e*-48*g* proximate to the branch ports of optical splitter 44*b* may avoid using the same address as the waypoint device 48*d* proximate to the trunk port of optical splitter 44*b*.

Each waypoint device 48 may include one or more wavelength-specific reflective elements. Each reflective element may be configured to reflect at least a portion of an optical signal having a wavelength λ used for probe signals (e.g., λ=1650±n×0.4 nm) and to pass optical signals ("traffic signals") having wavelengths used for carrying data (e.g., 1260 nm<λ<1625 nm). The reflection coefficient Γ of a reflective element at its specific wavelength λ may typically be in the range of Γ=−1 to −3 dB, which corresponds to a reflectivity R of about 50%<R<80%. Alternatively, the reflection coefficient Γ of a reflective element at its specific wavelength λ may be in the range of Γ=−3 to −10 dB, i.e., 10%<R<50%. Advantageously, configuring reflective elements to only reflect a portion of a probe signal may allow the further use of the probe signal by other downstream reflective elements operating at the same wavelength λ. Attenuation levels for signals outside the refection band for these types of devices are typically about 0.2 to 1.0 dB per reflective element. Waypoint devices 48 may be realized, for example, by splicing or integrating a reflective element onto the port of a module, such as an optical splitter or wavelength division multiplexing module, or by coupling the port to a pigtail including the waypoint device 48.

Wavelength specific reflective elements may be provided by a multi-layer thin-film stack of materials having different indexes of refraction (e.g., a multi-layer thin-film filter or grating) or other optical structure. Multi-layer thin-films may be deposited on the end-face of an optical fiber to form an integrated reflective element, or on a substrate for use as an external reflective element. Narrow-band reflective elements can be configured to have a specified reflectivity at a specified wavelength or at multiple specified wavelengths through selection of the proper dielectric values for each layer and/or the thicknesses of these layers. As described previously, one type of narrow-band reflective element suitable for use in fiber optic networks is commonly known as a fiber Bragg grating. Fiber Bragg gratings are a type of distributed Bragg reflector, and may be formed in a short segment of an optical fiber by varying the refractive index of the core of the fiber along the length of the segment. Exemplary fiber optic gratings suitable for use in waypoint devices can be obtained, for example, from Luna Innovations of Roanoke, Virginia, United States.

Figure 4:
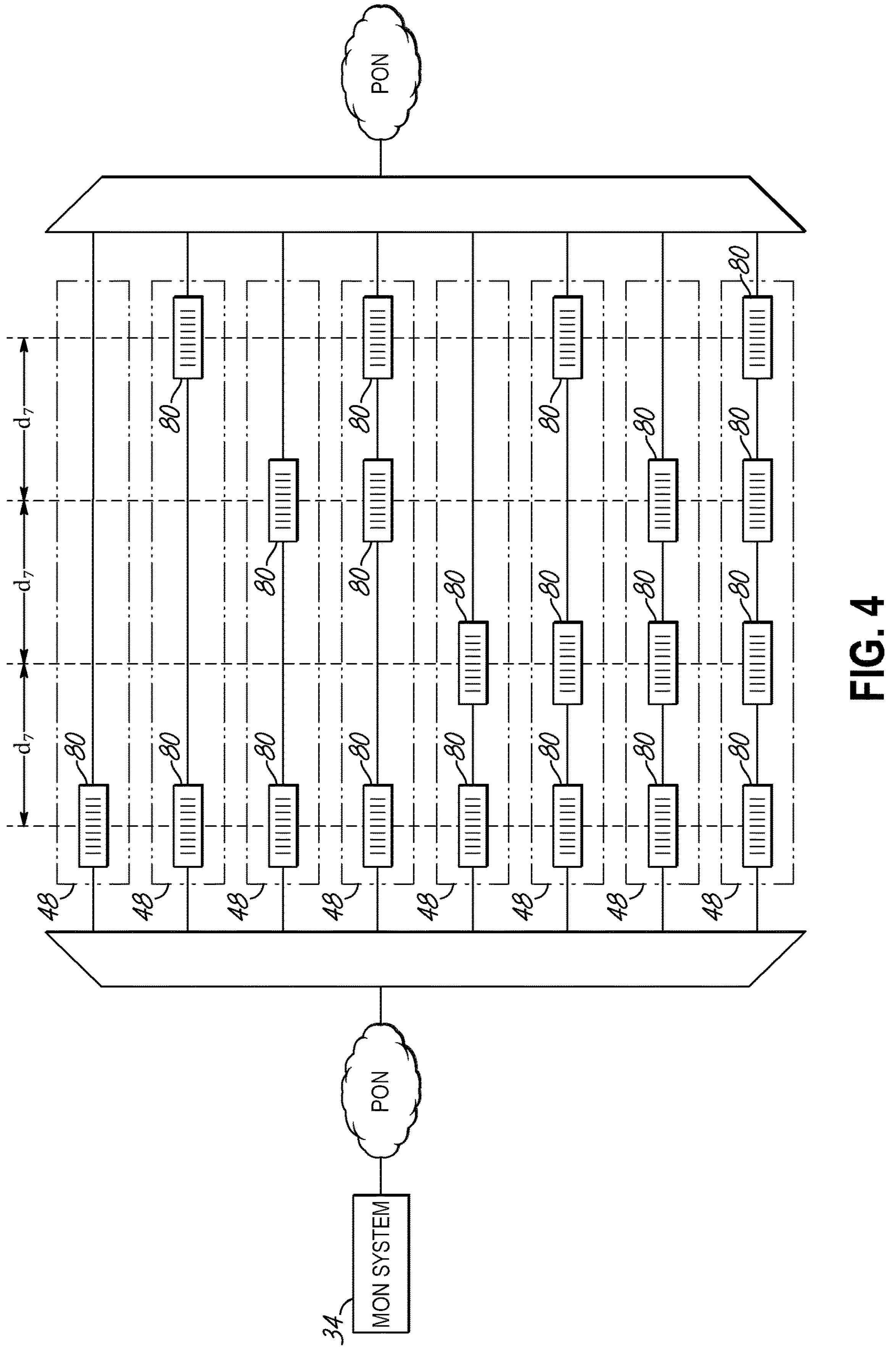
FIG. 4. is a schematic view illustrating a plurality of waypoint devices each including one or more reflective elements.

FIG. 4 depicts an exemplary address coding scheme that defines waypoint addresses by arranging reflective elements 80 (e.g., fiber Bragg gratings) at predetermined distances relative to one another. Advantageously, this type of addressing can function with a probe signal having a single wavelength or multiple wavelengths. The reflective elements are separated by a distance $d_7$ that is greater than the minimum distance which can be detected by the monitoring system 34. For a reflectometer that can resolve a minimum distance $d_{min}$ of about 0.6 m, the depicted 3-bit address addressing scheme could be implemented within each waypoint device 48 using between one and four reflective elements each separated from adjacent reflective elements by 0.6 meters of fiber, for example.

Figure 5:
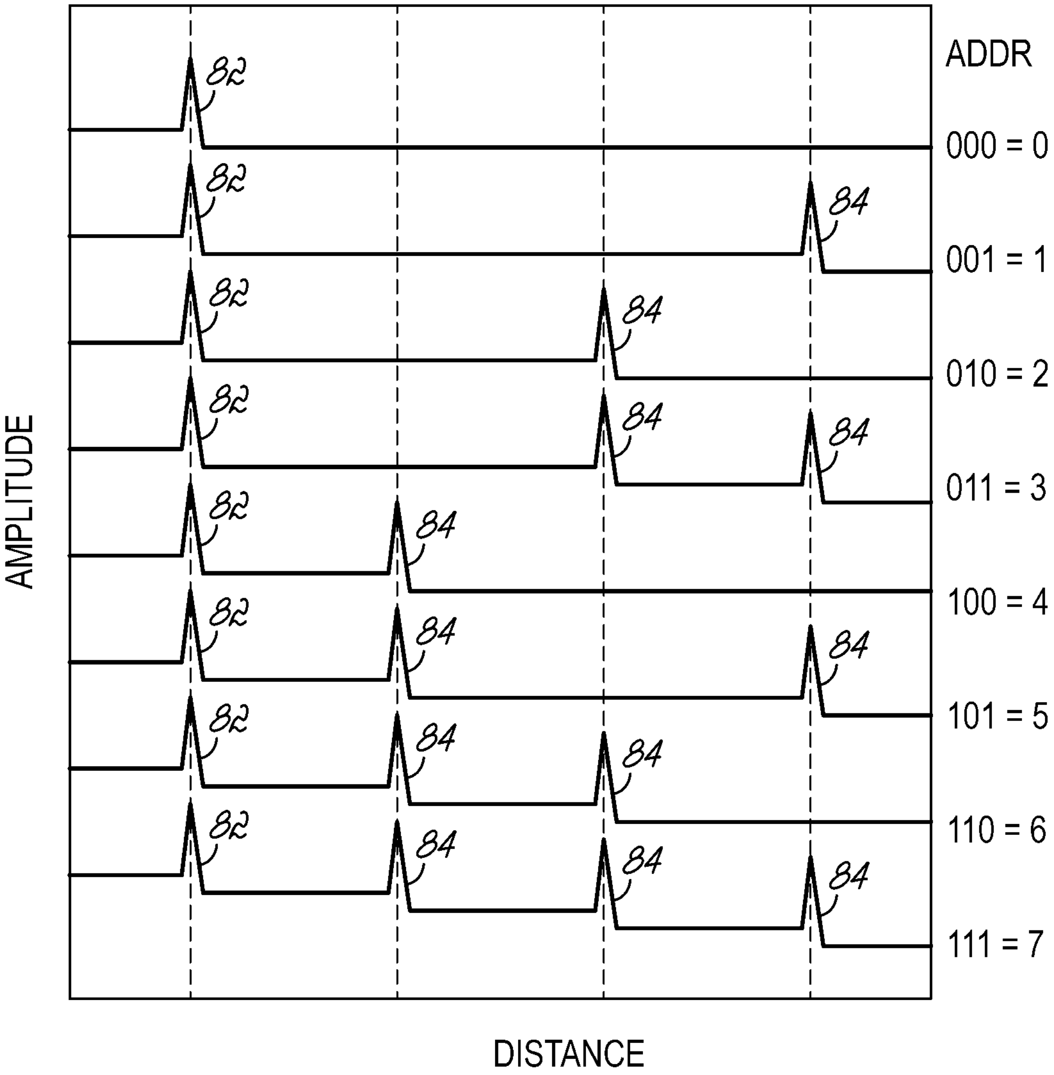
FIGS. 5-8 are a graphical views each illustrating a different address coding scheme for waypoint devices

FIG. 5 depicts a graph of received signal amplitude (e.g., in dB) verses distance (e.g., in nm) depicting reflected signals 82, 84 received from each exemplary address configuration of FIG. 4. In the depicted embodiment, a reflected signal 82 is received from reference reflective element 80 with no additional reflected signals 84 indicates an address=0. The reference reflected signal 82 provides a reference position against which distances to the other reflected signals 84 (when present) can be measured to determine the address of the waypoint device 48. Although the reference reflective element 80 in the depicted example is the reflective element 80 closest to the monitoring system 34, it should be understood that in an alternative embodiment, the reference reflective element 80 could be placed in another position relative to the other reflective elements 80, e.g., at the furthest point from the monitoring system 34. Individual reflective elements 80 may have a relatively low reflectivity R (e.g., R<20%) so that the probe signal can generate measurable reflections from each reflective element 80 encountered.

The amplitude of each reflected signal 82, 84 in FIG. 5 is depicted as being essentially the same, and thus provides a binary coding system. That is, each position provides either a "1" or a "0" to the address, thereby forming a bit-code. However, in an alternative embodiment, the amplitude may be varied to increase the amount of information provided by each reflective element 80. For example, each reference reflective element could be configured to have a known reflection coefficient Γ (e.g., Γ=−12 dB) to provide an amplitude reference. Each of the other reflective elements 80 could then have a reflection coefficient Γ selected from a known set of reflection coefficients, e.g., Γ=∈{<−20 dB (no reflective element), −3 dB, −6 dB, −9 dB}, The received amplitude of each of the other reflected signals (e.g., in dB relative to the probe signal) could then be compared to the received amplitude of the reference reflected signal to determine the reflection coefficient Γ of each of the other reflective elements 80, For a known set of reflection coefficients including four different reflection coefficients, this coding scheme would provide four possible values at each distance. Thus, the number of addresses would be increased from eight ($2^3$=8) addresses to sixty four ($4^3$=64) addresses. In an alternative embodiment, the coding system may be configured to operate without a reference bit. For example, the system could look for four adjacent peaks anywhere in the system, and interpret those peaks as a four-bit code. Coding systems that operate without the reference bit could further expand the number of addresses to sixteen ($2^4=16$) for four-bit binary codes and 256 ($4^4=256$) for four-bit quaternary codes, for example.

Figure 6:
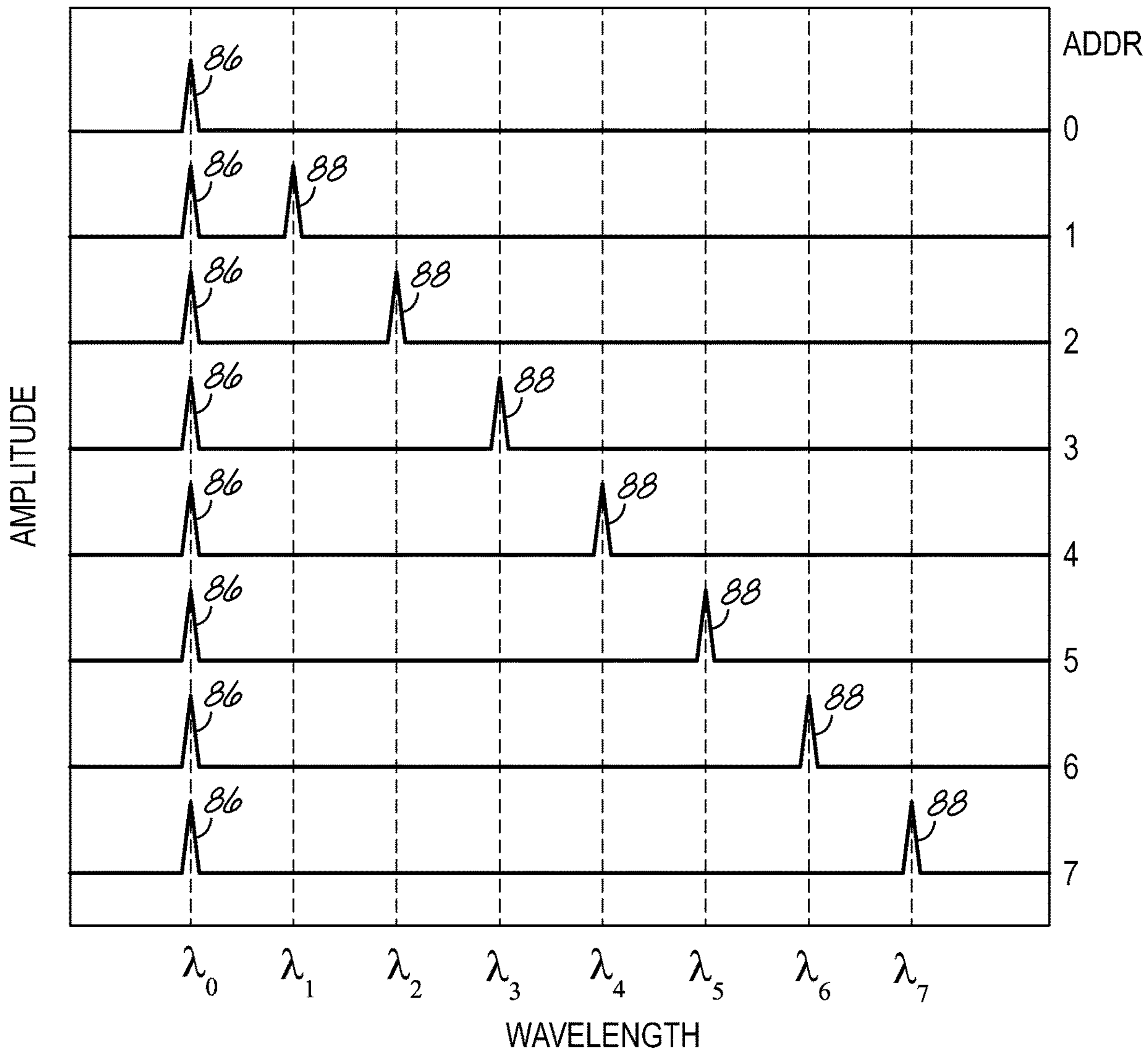

FIG. 6 depicts a graph of received signal amplitude (e.g., in dB) verses wavelength (e.g., in nm) for an exemplary address coding scheme based on wavelength. This addressing scheme may be implemented by configuring waypoint devices 48 to selectively reflect probe signals having different wavelengths $\lambda_n$. In the depicted embodiment, each wavelength indicates a single address, and a reflected signal 86 at a predetermined wavelength (e.g., $\lambda_0$) received from a reference reflective element 80 with no additional reflected signals 88 indicates an address=0. In the depicted embodiment, this wavelength $\lambda_1$) may also be used as a wavelength reference to facilitate accurate decoding of the other reflected signals.

For reflective elements 80 that are thermally stable, a reference wavelength may not be required. In this case, only one reflective element 80 would be needed for each address. For reflective elements 80 that are not thermally stable, each non-reference reflective element may be paired with a reference reflective element, or otherwise configured to reflect a portion of the reference wavelength, so that the address can be accurately determined based on the difference between the wavelengths of the received reflected signals. Advantageously, using reference reflective elements may reduce costs as compared to using thermal packaging or temperature compensation. However, the need for a reference reflective element may result in waypoint devices 48 having a higher insertion loss than one using thermally stable reflective elements.

The address coding scheme depicted by FIG. 6 encodes one address per wavelength. By way of example, probe signals spaced about a wavelength $\lambda$=1650 nm and having a 50 GHz spacing (0.4 nm) for each address, the eight addresses shown would require about 3.2 nm of bandwidth. Reflective elements 80 in single wavelength-based addressing schemes may be combined in the hierarchical manner shown by FIG. 2. As with the distance-based coding described above, the reflectance R of the reflective elements used in wavelength-based address coding schemes may be relatively low (e.g., R<20%) to enable subsequent reflective elements to use the same wavelength.

Figure 7:
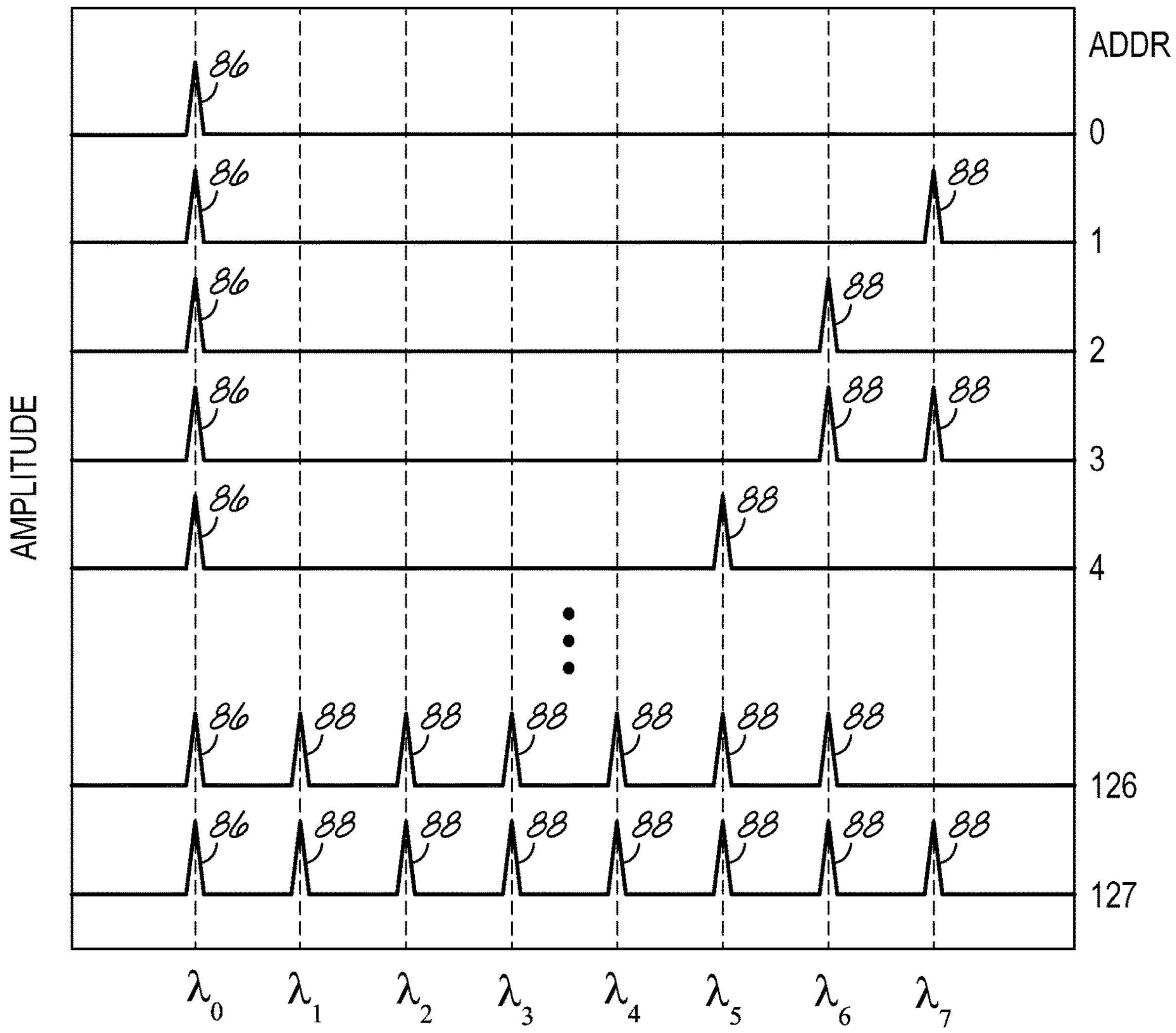

FIG. 7 depicts a wavelength-based addressing scheme in accordance with another embodiment of the disclosure in which each probe signal wavelength $\lambda_n$ is used to provide one bit in a binary address. As with the wavelength-based addressing scheme of FIG. 6, the reflective elements 80 may be thermally stable or each waypoint device 48 may include a reference reflective element 80 to enable the address to be decoded based on the differences in wavelength of the reflected signals.

Figure 8:
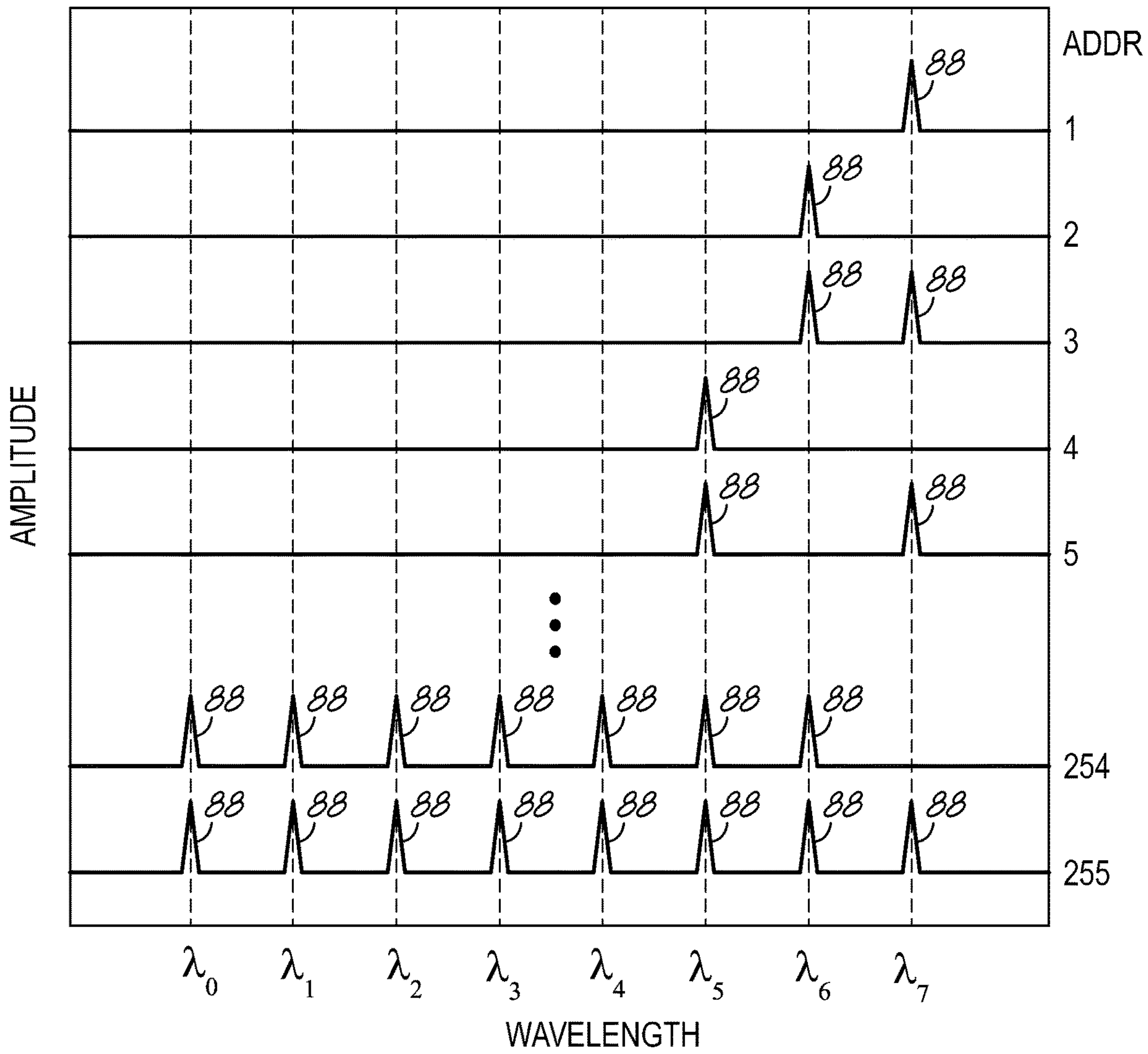

FIG. 8 depicts a wavelength-based addressing scheme in accordance with another embodiment of the disclosure that operates without a reference reflective element so that each probe signal wavelength $\lambda_n$ can be used to provide one bit in a binary address. Freeing up the reference wavelength to carry address information nearly doubles the number of addresses available, e.g., from 128 addresses to 255 addresses.

Although not separately depicted for purposes of brevity, it should be understood that any combination of distance, amplitude, and wavelength may be used to provide large numbers of unique addresses. For example, each of the spaced reflective elements 80 in FIG. 4 could have one or both of multiple wavelengths and reflection coefficients. Thus, the address coding schemes that can be implemented using various combinations of reflective elements are not limited to just those specifically depicted by FIGS. 5-8.

Information indicative of the address of each waypoint device 48 may be provide in human readable (e.g., text) or machine readable (e.g., barcode) on an outer surface of the waypoint device 48 at the factory. The physical location of a connected port can be determined by a technician at the cabinet on the street, in a building, or in a home. The printed address and physical location can thus be identified at the time of installation of the component, and linked to the logical location in the optical distribution network as identified by the monitoring system 34 at the switching point 12. This information may be stored and organized in a database and accessed through a database server to facilitate the writing and execution of work orders, or for other network management purposes.

At least some embodiments of the waypoint device may include one or more reflective elements 80 having optical properties which can be altered by application of a perturbation. Applying heat, strain, or vibration to such a reflective element 80 may cause one or more of the reflected wavelength $\lambda$, reflection coefficient $\Gamma$, or some other optical parameter of the reflective element 80 to vary. For example, fiber Bragg gratings are typically sensitive to temperature changes which, through thermal expansion of the waveguide fiber, cause changes in the wavelength of the peak reflection. Fiber Bragg gratings can also sense strain (which may be caused by tensile forces on the optical fiber) and torque (which may be caused by twisting of the optical fiber).

The external perturbation that produces the strain or torque can be continuous, periodic, or intermittent. When a sensing reflective element 80 is perturbed, the spectral response may shift. This shift can be detected by measuring the shift directly or by measuring a corresponding shift in amplitude of the reflected signal. For example, tuning an optical time domain reflectometer laser slightly off the peak wavelength of a fiber Bragg grating may cause any induced strain to directly impact the amplitude of the reflected signal. This impact may be due to the peak wavelength of the fiber Bragg grating shifting with respect to the incident laser wavelength.

If a waypoint device 48 includes one or more reflective elements 80 sensitive to a perturbation, the return signal generated by the waypoint device 48 can be altered by applying the perturbation. Perturbations may include, for example, heating, cooling, stretching, straining, bending, or the application of repetitive cycling e.g., via acoustic waves. So long as the resulting perturbation in the return signal is detectable (e.g., by observing a shift in or modulation of a reflection imbedded in the return signal), the identity of the specific waypoint device 48 being perturbed can be confirmed.

Figure 9:
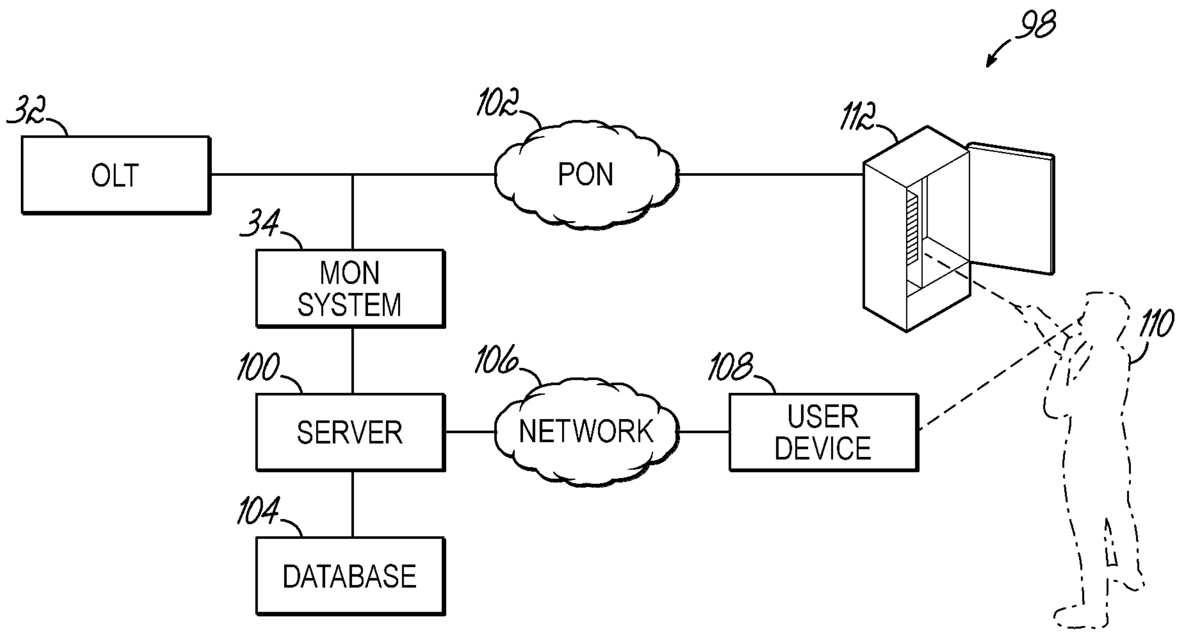
FIGS. 9 and 10 are schematic views illustrating a monitoring system, server, database, and user device configured to identify a waypoint device having a reflective element that is sensitive to perturbations.
Figure 10:
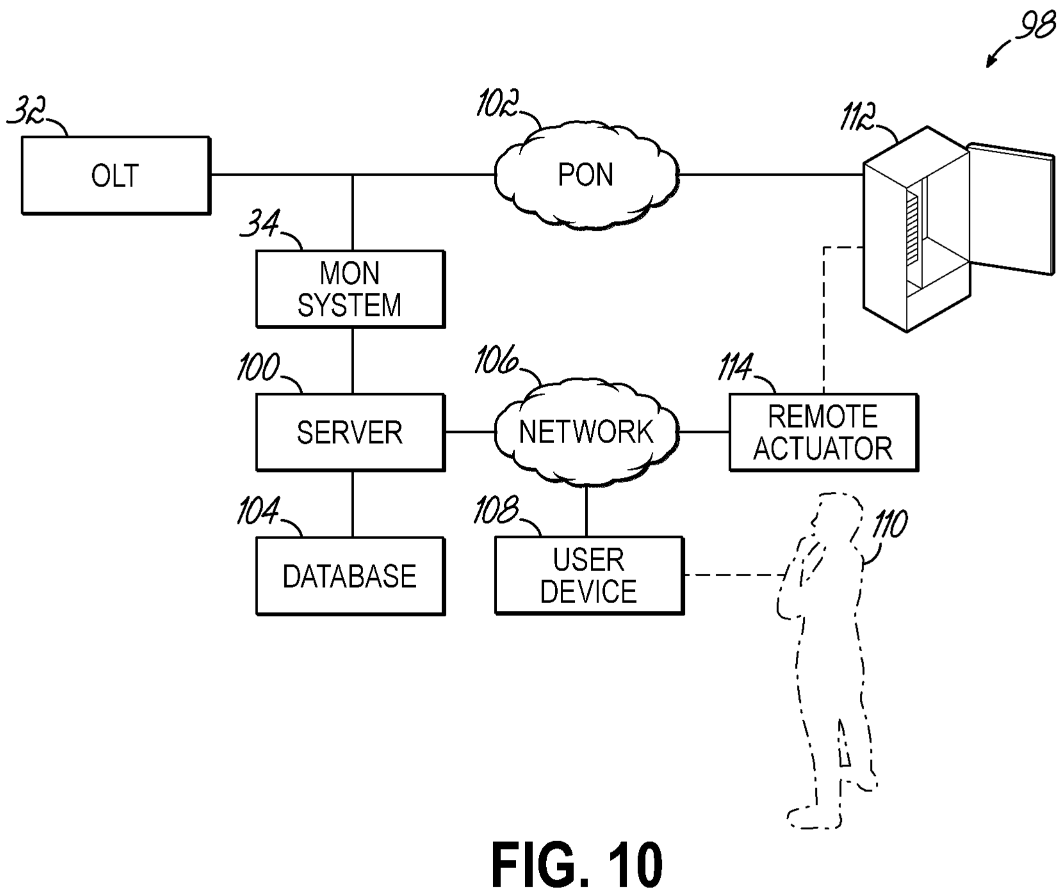

FIGS. 9 and 10 depict an exemplary operating environment 98 including the optical line terminal 32 and monitoring system 34, as well as a database server 100. The optical line terminal 32 and monitoring system 34 are operatively coupled to a PON 102, and the database server 100 is in communication with a database 104 and a data network 106, e.g., the Internet. As depicted by FIG. 9, the data generated by the database server 100 and/or stored in the database 104 may be accessed over the data network 106 with a user device 108 (e.g., a laptop computer, tablet computer, smartphone, etc.) by an authorized user, such as a network technician 110.

As depicted by FIG. 9, the network technician 110 may be executing a work order at a network cabinet 112. Under this scenario, the network technician 110 may physically interact with a waypoint device 48 associated with a network component (e.g., a drop port on a splitter) while observing the return signal received by the monitoring system 34 in real time on the user device 108. The network technician 110 may thereby verify the network component identified by the work order has been selected based on visible changes in the displayed portion of the return signal. Enabling a field technician to view optical time domain reflectometry data while physically interacting with a waypoint device 48 to validate that the waypoint device 48 is attached to the port identified in a work order is referred to herein as "closed-loop physical validation".

As depicted by FIG. 10, the database server 100 may also communicate with a remote actuator 114 over the data network 106. The remote actuator 114 may include a heater, vibrator, or other device that provides a perturbation to the waypoint device 48 in response to a command signal from the database server 100. Under this scenario, the network technician 110 may selectively perturb the waypoint device 48 from a remote location while viewing return signals received by the monitoring system 34. This feature may allow technicians to troubleshoot the PON from a network operations center or by logging in to the database server 100 from home.

In both the on-site and remote scenarios, the ability to induce detectable changes in the return signals generated by a waypoint device 48 enables tactile, real time, closed loop confirmation of the identity of a labelled network component. Purposely applying a perturbation to a waypoint device 48 in the field can thus provide real time information that helps identify and localize a specific optical component of the PON. Field technicians may thereby validate a port in the PON by physically perturbing (e.g., pinching, stressing, heating, or vibrating) the waypoint device 48 in a way that alters the optical properties of one or more reflective elements thereof.

A fiber Bragg grating is one type of optical device that can be both sensitive to perturbations and suitable for used as a reflective element 80. However, it should be understood that other types of optical devices can be used to provide the above described sensing function in a PON. For example, an optical fiber configured to be sensitive to bending at wavelengths used by probe signals (e.g., $\lambda \approx 1650$ nm) and insensitive to bending at wavelengths used for traffic optical signals (e.g., 1200-1600 nm) could be used as a sensing element. An optical fiber could be configured to have this property, for example, by configuring the core of the optical fiber so that bending would cause a sufficient increase in scattering of light out of the core to be noticeable at the network monitoring wavelengths but not enough of an increase in scattering at traffic wavelengths to cause a noticeable attenuation of the traffic optical signals.

In an exemplary embodiment, one or more reflective elements 80 each comprising a fiber Bragg grating may be defined in an optical fiber of a pigtail. The fiber Bragg gratings may be defined in the optical fiber using any suitable method, such as by creating an optical grating along an optical fiber by selectively exposing portions of the optical fiber to ultraviolet light. Optical fibers are typically coated with an acrylate polymer material that is generally opaque to ultraviolet light. However, use of a thin coating (e.g., 10-20 microns thick) can enable gratings to be formed by writing through the coating without stripping/recoat. Use of thin coatings may reduce the cost and improve the scalability of manufacturing fiber Bragg gratings by enabling the use of offline reel to reel processing. Another benefit of using thin coatings is that a thin coating may enable a sensor made using this process to be more sensitive to bends or other perturbations that produce strain in the optical fiber as compared to one with a thick coating. In cases where a thicker coating is desired, the thinly coated optical fiber may be recoated after the gratings have been defined. Methods of defining optical gratings in an optical fiber are disclosed by commonly owned U.S. Pub. No. 2022/0171122, the disclosure of which is incorporated by reference herein in its entirety.

The above grating formation process may enable waypoint devices 48 to be manufactured economically by using reel to reel processing of fiber to embed a series of unique fiber Bragg grating labels into a fiber optic cable. This fiber optic cable could then be processed onto splitters, or alternatively spliced to splitter pigtails to form a labelled splitter. This process may be particularly scalable to high volume and low cost when used to form weak gratings (e.g., gratings with return loss<10%), since weak gratings can be written into a fiber relatively quickly using a continuous process that may be performed separately from the splitter manufacturing process.

Once a large quantity of pigtails with embedded fiber Bragg grating labels have been manufactured offline, the pigtails can be incorporated into many components that are placed into a PON. These components may include, but are not limited to, splitters used in centralized split, distributed split, cascaded split, and variable cascaded split architectures, wavelength division multiplexers and demultiplexers, or coexistence elements, and may be located on optical network terminals placed at the end points of the network.

Employing weak gratings that are positioned out of band from the traffic optical signals may allow the reflective elements 80 to have an almost undetectable effect on the traffic optical signals. Thus, waypoint devices 48 can be minimally intrusive and unlikely to negatively affect the performance of the PON. Fiber Bragg gratings can be analyzed by a variety of methods in order to discriminate perturbations in a network of sensors using amplitude changes, wavelength shifts, or by monitoring other properties such as changes in Brillouin shift.

Each perturbation sensing waypoint device 48 may be assigned a unique address in the PON 102 to allow associated network components to be discriminated from one another. Address coding schemes based on combinations of relative amplitudes, wavelengths, and distances between return signals from the reflective elements of each waypoint device 48 may create a large enough set of unique addresses to facilitate unique labeling of a large number of ports in a typical PON.

Weak Bragg gratings having relatively low reflection coefficients $\Gamma \leq -3$ dB) may provide an economic advantage over stronger gratings because it generally takes less time to write a shallow grating than a deep grating. This advantage may be even greater for gratings with reflection coefficients below −7 dB (i.e., a reflectance R<20%). By writing gratings that operate out of band, traffic interruption, crosstalk, and invasion of active spectral bands can be avoided. For example, gratings may operate at wavelengths outside of traffic carrier bands (e.g., $\lambda$>1625 or $\lambda$<1250 nm), or at intermediate wavelengths toward the edge of active PON transmission bands (e.g., $\lambda$=1500-1520 nm). In each of these bands, there may be traffic carrying wavelengths close by. Accordingly, it may be advantageous to constrain the wavelength and amplitude of reflective elements so as to minimize their effects on copropagating traffic optical signals employed in the PON.

Field technicians with access to a port during maintenance or upgrade operations can interact physically with sensing waypoint devices by applying mechanical stress, heat, or acoustic energy to the device. The physical location of the port connected to the waypoint device, as identified by the technician, can then be positively linked to the optical path identified by the monitoring system 34 as being associated with the waypoint device. Using this method to systematically test existing ports, or during a progressive network building process, can produce a map the entire optical pathway through the PON.

Waypoint devices that are sensitive to perturbations thereby enable validation to confirm that a port (in hand or undergoing perturbation) is connected to the intended optical line terminal in the plan of record, or connected in the right branch of the PON, provided the monitoring system can identify the source of the perturbation accurately. This capability to positively identify network components may eliminate the anxiety or delay associated with upgrades or modifications to a live PON carrying subscriber traffic. This capability also assures that a field technician operating on a network carrying live traffic can avoid causing an inadvertent traffic interruption by ensuring that they avoid disconnecting or otherwise interfering with a misidentified network fiber or connection.

In an alternative embodiment, a separate perturbation sensitive optical component could be added to the PON, e.g., in cases where the waypoint devices are insensitive to perturbations. For example, a "chromatically bend sensitive" optical fiber may be configured to be sensitive to bend induced loss at an out of band wavelength (e.g., $\lambda$=1620 nm) and relatively insensitive to bend induced loss at in band wavelengths (e.g., 1250<$\lambda$<1600 nm). Placing a length of such a chromatically bend sensitive optical fiber in the optical path may generate a traceable change in return loss on an optical time domain reflectometer. For example, if a port is pigtailed with a chromatically bend sensitive fiber, a field technician could bend the pigtail to test the optical path and validate that the port in hand is the correct port associated with the work order by viewing the optical time domain reflectometer output of monitoring system 34. Chromatically bend sensitive fibers could be added to all optical network components to enable port identification throughout any PON.

In operation, the monitoring system 34 may be used to identify and locate faults in the PON, such as broken fibers, faulty connections, etc. During initial build-out or when the PON is expanded, technicians may install waypoint devices 48 at or proximate to demarcation points. Technicians may then remotely communicate with the server 100 and instruct the optical interrogator to interrogate the PON. The results of this interrogation (e.g., return signals) may be compared to previous results stored in the database 104. The addresses of waypoint devices embedded in the return signals may facilitate locating new equipment and documenting changes to the return signals caused by the addition of new optical components, connections, ports, terminals, etc.

After one or more waypoint devices 48 have been installed in the PON, the technician responsible may cause the optical interrogator to interrogate the PON to test the integrity of any new deployments and to obtain the addresses and optical path distances to the newly installed waypoint devices 48. The technician may also upload information relating to the newly installed waypoint devices 48, such as their optical address, geographical location (e.g., as determined by GPS), location within an equipment cabinet, etc. This information may be stored and organized in the database 104 to build a trusted source of network configuration information that is progressively updated as the PON is constructed, expanded, or otherwise modified.

When the PON is initially deployed, and periodically thereafter, the monitoring system 34 may transmit one or more probe signals into the PON. The monitoring system 34 may then generate a reference return signal based on the one or more return signals, and store the reference return signal in the database 104. The reference return signal may include multiple reflections at different intensities, wavelengths, optical path distances, and that contain different embedded addresses. Different demarcation points and other portions of the PON may then be associated with different features of the reference return signal. Unexpected changes in these features may be indicative of a problem in the PON.

The reference return signal and the associated PON data stored in the database 104 may be integrated with a web-based map that displays one or more of the geographic location and network location of the demarcation points. Portions of the reference return signal may be associated with locations on the map and displayed through a graphical user interface. By way of example, this graphical user interface may enable a technician to view a portion of the reference return signal or a real-time return signal associated with a demarcation point by tapping on an icon representing the demarcation point on the map. In response to receiving an outage notification, the monitoring system 34 may interrogate the PON and compare the current return signal to the reference return signal. Any anomalies in the current return signal may be correlated with reflection peaks corresponding to one or more waypoint devices 48 to determine what part of the PON is causing each anomaly. The location of any anomalies may then be displayed on the map, thereby speeding diagnosis of the cause of the outage.

Figure 11:
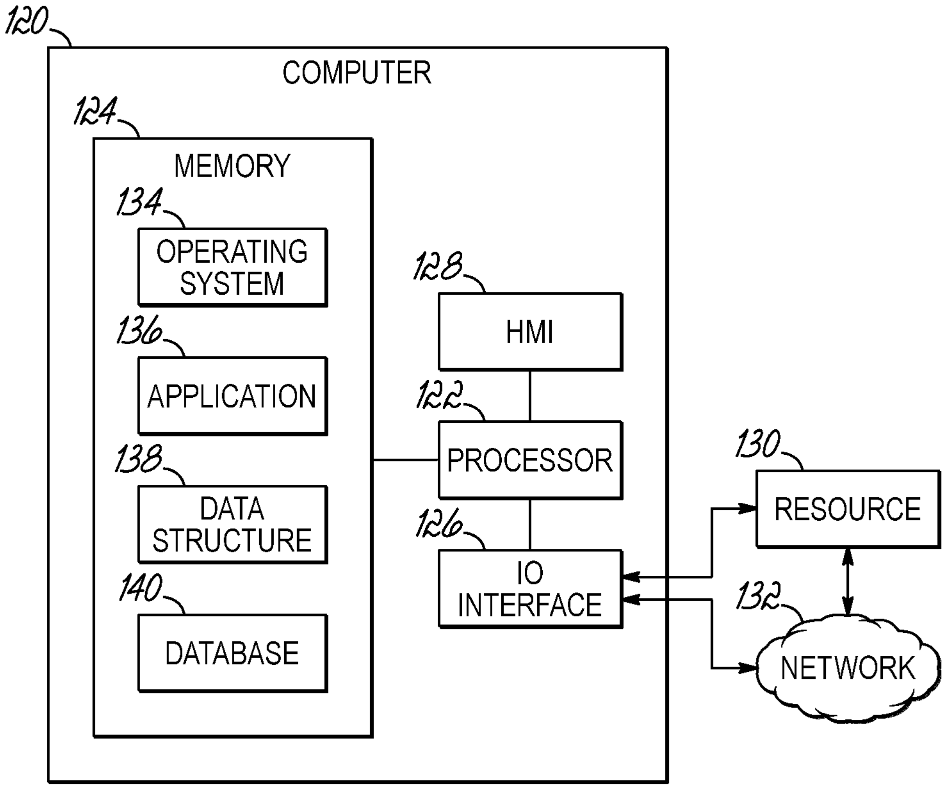
FIG. 11 is a schematic view of an exemplary computer that may be used in one or more of the monitoring system, server, database, and user device depicted by FIGS. 9 and 10.

Referring now to FIG. 11, embodiments of the disclosure described above, or portions thereof such as, but not limited to, the processing unit 42, database server 100, database 104, and user device 108, may be implemented using one or more computer devices or systems, such as exemplary computer 120. The computer 120 may include a processor 122, a memory 124, an input/output (I/O) interface 126, and a Human Machine Interface (HMI) 128. The computer 120 may also be operatively coupled to one or more external resources 130 via the network 132 or I/O interface 126. External resources may include, but are not limited to, servers, databases, mass storage devices, peripheral devices, cloud-based network services, or any other resource that may be used by the computer 120.

The processor 122 may operate under the control of an operating system 134 that resides in memory 124. The operating system 134 may manage computer resources so that computer program code embodied as one or more computer software applications, such as an application 136 residing in memory 124, can have instructions executed by the processor 122. One or more data structures 138 may also reside in memory 124, and may be used by the processor 122, operating system 134, or application 136 to store or manipulate data.

The HMI 128 may be operatively coupled to the processor 122 of computer 120 to allow a user to interact directly with the computer 120. The HMI 128 may include a display, touch screen, speaker, and any other suitable audio and visual indicators capable of providing data to the user. The HMI 128 may also include input devices and controls such as a keyboard, pointing device, touch screen, microphone, etc., capable of accepting input from the user and transmitting the entered input to the processor 122.

A database 140 may reside in memory 124, and may be used to collect and organize data used by the various systems and modules described herein. The database 140 may include data and supporting data structures that store and organize the data. In particular, the database 140 may be arranged with any database organization or structure including, but not limited to, a relational database, a hierarchical database, a network database, or combinations thereof. A database management system in the form of a computer software application executing as instructions on the processor 122 may be used to access the information or data stored in records of the database 140 in response to a query, which may be dynamically determined and executed by the operating system 134, other applications 136, or one or more modules.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A system for monitoring a passive optical network, comprising:

a transmitter configured to transmit a probe signal into the passive optical network;

a receiver configured to receive a return signal from the passive optical network;

a plurality of waypoint devices each including one or more reflective elements configured to embed an address of the waypoint device in the return signal;

one or more processors operatively coupled to the transmitter and the receiver; and a memory operatively coupled to the one or more processors, wherein each waypoint device is located in one or more optical paths of the passive optical network, and the memory includes a program code that, when executed by the one or more processors, causes the system to, for each waypoint device:

extract the address of the waypoint device from the return signal, and identify a network waypoint in the passive optical network associated with the waypoint device based at least in part on the address of the waypoint device; and wherein the program code causes the system to extract the address of each waypoint device from the return signal by:

identifying a plurality of reflected signals that are associated with the waypoint device, determining one or more spacings between the plurality of reflected signals, determining the address of the waypoint device based at least in part on the one or more spacings between the plurality of reflected signals; and the program code causes the system to:

identify at least one of the plurality of reflected signals as a reference reflected signal, and determine the one or more spacings between the plurality of reflected signals based on an optical path distance between the reference reflected signal and each of the other reflected signals of the plurality of reflected signals.

2. The system of claim 1, wherein the program code further causes the system to:

determine an optical path distance to the waypoint device based on the return signal, and identify the network waypoint in the passive optical network associated with the waypoint device based on both the address of the waypoint device and the optical path distance to the waypoint device.

3. The system of claim 1, wherein the program code further causes the system to extract the address of each waypoint device from the return signal by:

determining an amplitude of each of the other reflected signals of the plurality of reflected signals relative to the amplitude of the reference reflected signal, and determining the address of the waypoint device based at least in part on the relative amplitudes of the other reflected signals of the plurality of reflected signals.

4. The system of claim 1, wherein the program code causes the system to extract the address of each waypoint device from the return signal by:

identifying one or more reflected signals that are associated with the waypoint device;

determining a wavelength of each of the one or more reflected signals; and determining the address of the waypoint device based at least in part on the wavelength of each of the one or more reflected signals.

5. The system of claim 4, wherein:

the one or more reflected signals include a plurality of reflected signals;

the program code further causes the system to identify at least one of the plurality of reflected signals as a reference reflected signal; and the wavelength of each of the reflected signals other than the reference reflected signal is determined based on a comparison between the wavelength of the reflected signal and the wavelength of the reference reflected signal.

6. The system of claim 5, wherein the program code further causes the system to extract the address of each waypoint device from the return signal by:

determining an amplitude of each of the reflected signals other than the reference reflected signal relative to the amplitude of the reference reflected signal, and determining the address of the waypoint device based at least in part on the relative amplitudes of the reflected signals.

7. The system of claim 1, wherein at least one reflective element of at least one of the waypoint devices includes a reflective characteristic that changes in response to a perturbation.

8. The system of claim 7, further comprising:

an actuator in communication with the one or more processors and configured to generate the perturbation; and a human machine interface operatively coupled to the one or more processors, wherein the program code is further configured to cause the system to:

receive input from the human machine interface indicating activation of the actuator, and in response to receiving the input, activate the actuator.

9. The system of claim 7, further comprising:

a human machine interface operatively coupled to the one or more processors, wherein the program code is further configured to cause the system to:

identify a waypoint device being perturbed based on a change in the reflective characteristic of the one or more reflective elements, and in response to identifying the waypoint device being perturbed, cause the human machine interface to provide an indication of the identity of the waypoint device being perturbed.

10. A method of monitoring a passive optical network that includes a plurality of waypoint devices, the method comprising:

transmitting a probe signal into the passive optical network;

perturbing one of the plurality of waypoint devices;

reflecting, by each waypoint device of the plurality of waypoint devices, one or more reflected signals each including a portion of the probe signal, and detecting a change in a characteristic of one or more reflected signals associated with the waypoint device being perturbed and the one or more reflected signals embedding an address of the waypoint device in a return signal for providing an indication of the identity of the waypoint device being perturbed;

receiving the return signal from the passive optical network; and for each waypoint device:

extracting the address of the waypoint device from the return signal, and identifying a network waypoint in the passive optical network associated with the waypoint device based at least in part on the address of the waypoint device.

11. The method of claim 10, further comprising:

determining an optical path distance to the waypoint device based on the return signal; and identifying the network waypoint in the passive optical network associated with the waypoint device based on both the address of the waypoint device and the optical path distance to the waypoint device.

12. The method of claim 10, wherein extracting the address of the waypoint device from the return signal comprises:

identifying the one or more reflected signals that are associated with the waypoint device, and determining the address of the waypoint device based at least in part on one or more of a number of the one or more reflected signals, one or more spacings between the one or more reflected signals, one or more wavelengths of the one or more reflected signals, and one or more amplitudes of the one or more reflected signals.

13. The method of claim 12, wherein the one or more reflected signals include a plurality of reflected signals, and further comprising:

identifying at least one of the plurality of reflected signals as a reference reflected signal, wherein:

determining the one or more spacings between the plurality of reflected signals includes determining an optical path distance between the reference reflected signal and each of the other reflected signals of the plurality of reflected signals, determining the wavelength of each reflected signal includes comparing the wavelength of each of the other reflected signals of the plurality of reflected signals to the wavelength of the reference reflected signal, and determining the amplitude of each reflected signal includes comparing the amplitude of each of the other reflected signals of the plurality of reflected signals to the amplitude of the reference reflected signal.

14. The method of claim 10, wherein perturbing the one of the plurality of waypoint devices comprises:

activating an actuator configured to generate a perturbation in the one of the plurality of waypoint devices.

15. A system for monitoring a passive optical network, comprising:

a transmitter configured to transmit a probe signal into the passive optical network;

a receiver configured to receive a return signal from the passive optical network;

a plurality of waypoint devices each including one or more reflective elements configured to embed an address of the waypoint device in the return signal, wherein at least one reflective element of at least one of the waypoint devices of the plurality of waypoint device includes a reflective characteristic that changes in response to a perturbation;

one or more processors operatively coupled to the transmitter and the receiver;

an actuator in communication with the one or more processors and configured to generate the perturbation;

a human machine interface operatively coupled to the one or more processors; and a memory operatively coupled to the one or more processors, wherein each waypoint device is located in one or more optical paths of the passive optical network, and the memory includes program code that, when executed by the one or more processors, causes the system to, for each waypoint device:

extract the address of the waypoint device from the return signal, and identify a network waypoint in the passive optical network associated with the waypoint device based at least in part on the address of the waypoint device, and wherein the program code is configured to cause the system to:

receive input from the human machine interface indicating activation of the actuator, and in response to receiving the input, activate the actuator.

16. The system of claim 15, wherein the program code further causes the system to:

determine an optical path distance to the waypoint device based on the return signal, and identify the network waypoint in the passive optical network associated with the waypoint device based on both the address of the waypoint device and the optical path distance to the waypoint device.

17. The system of claim 15, wherein the program code causes the system to extract the address of each waypoint device from the return signal by:

identifying a plurality of reflected signals that are associated with the waypoint device, determining one or more spacings between the plurality of reflected signals, and determining the address of the waypoint device based at least in part on the one or more spacings between the plurality of reflected signals.

18. The system of claim 17, wherein the program code further causes the system to:

identify at least one of the plurality of reflected signals as a reference reflected signal, and determine the one or more spacings between the plurality of reflected signals based on an optical path distance between the reference reflected signal and each of the other reflected signals of the plurality of reflected signals.

19. The system of claim 18, wherein the program code further causes the system to extract the address of each waypoint device from the return signal by:

determining an amplitude of each of the other reflected signals of the plurality of reflected signals relative to the amplitude of the reference reflected signal, and determining the address of the waypoint device based at least in part on the relative amplitudes of the other reflected signals of the plurality of reflected signals.

20. The system of claim 15, wherein the program code causes the system to extract the address of each waypoint device from the return signal by:

identifying one or more reflected signals that are associated with the waypoint device;

determining a wavelength of each of the one or more reflected signals; and determining the address of the waypoint device based at least in part on the wavelength of each of the one or more reflected signals.

21. The system of claim 20, wherein:

the one or more reflected signals include a plurality of reflected signals;

the program code further causes the system to identify at least one of the plurality of reflected signals as a reference reflected signal; and the wavelength of each of the reflected signals other than the reference reflected signal is determined based on a comparison between the wavelength of the reflected signal and the wavelength of the reference reflected signal.

22. The system of claim 21, wherein the program code further causes the system to extract the address of each waypoint device from the return signal by:

determining an amplitude of each of the reflected signals other than the reference reflected signal relative to the amplitude of the reference reflected signal, and determining the address of the waypoint device based at least in part on the relative amplitudes of the reflected signals.

23. A method of monitoring a passive optical network that includes a plurality of waypoint devices, the method comprising:

transmitting a probe signal into the passive optical network;

reflecting, by each waypoint device of the plurality of waypoint devices, one or more reflected signals each including a portion of the probe signal, the one or more reflected signals embedding an address of the waypoint device in a return signal;

receiving the return signal from the passive optical network; and for each waypoint device:

extracting the address of the waypoint device from the return signal, and identifying a network waypoint in the passive optical network associated with the waypoint device based at least in part on the address of the waypoint device, and where the one or more reflected signals include a plurality of reflected signals, and further comprising:

identifying at least one of the plurality of reflected signals as a reference reflected signal, wherein:

determining the one or more spacings between the plurality of reflected signals includes determining an optical path distance between the reference reflected signal and each of the other reflected signals of the plurality of reflected signals, determining the wavelength of each reflected signal includes comparing the wavelength of each of the other reflected signals of the plurality of reflected signals to the wavelength of the reference reflected signal, and determining the amplitude of each reflected signal includes comparing the amplitude of each of the other reflected signals of the plurality of reflected signals to the amplitude of the reference reflected signal.

24. The method of claim 23, further comprising:

determining an optical path distance to the waypoint device based on the return signal; and identifying the network waypoint in the passive optical network associated with the waypoint device based on both the address of the waypoint device and the optical path distance to the waypoint device.

25. The method of claim 23, wherein extracting the address of the waypoint device from the return signal comprises:

identifying the one or more reflected signals that are associated with the waypoint device, and determining the address of the waypoint device based at least in part on one or more of a number of the one or more reflected signals, one or more spacings between the one or more reflected signals, one or more wavelengths of the one or more reflected signals, and one or more amplitudes of the one or more reflected signals.

26. The method of claim 23, further comprising:

perturbing one of the plurality of waypoint devices;

detecting a change in a characteristic of one or more reflected signals associated with the waypoint device being perturbed; and providing an indication of the identity of the waypoint device being perturbed.

27. The method of claim 26, wherein perturbing the one of the plurality of waypoint devices comprises:

activating an actuator configured to generate a perturbation in the one of the plurality of waypoint devices.

* * * * *